July 5, 1938.   S. C. LEONARD, JR   2,122,477

METHOD OF MAKING AN OIL SEAL

Filed Aug. 3, 1935

INVENTOR
SIMPSON C. LEONARD, JR.
BY
ATTORNEY

Patented July 5, 1938

2,122,477

UNITED STATES PATENT OFFICE 2,122,477

METHOD OF MAKING AN OIL SEAL

Simpson C. Leonard, Jr., Detroit, Mich.

Application August 3, 1935, Serial No. 34,548

1 Claim. (Cl. 29—148.2)

This invention relates to a method of making an oil seal.

An object of the invention is to provide an improved metallic housing for a self-contained sealing unit having a minimum of parts and weight and which has sufficient strength to resist the strains and stresses imposed thereon; and to provide improved means for retaining the component parts in assembled relation.

Another object of the invention is to provide an improved method of deforming a portion of the housing for retaining the parts of the unit in assembled relation and simultaneously increasing the physical properties of the metal.

Other objects and advantages of the invention will be more apparent from the following description taken in connection with the accompanying drawing, in which.

Figures 1, 2:
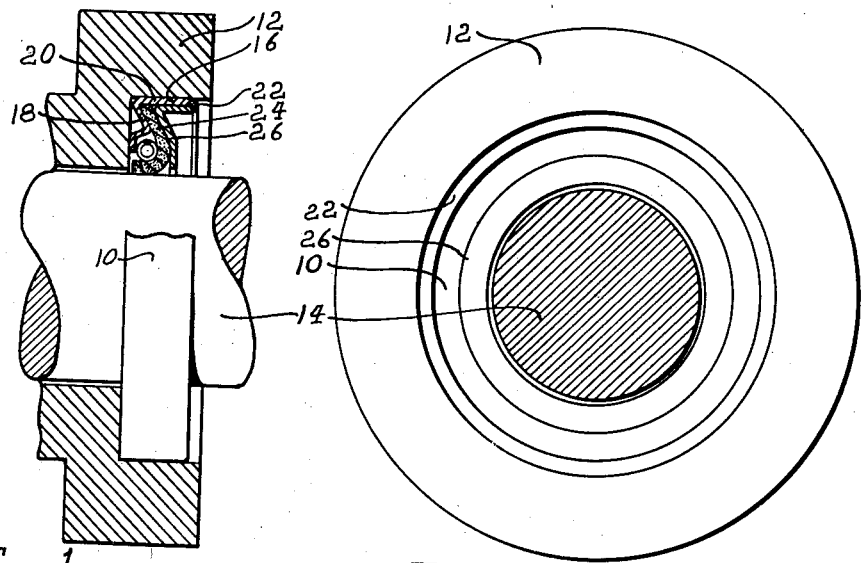
Fig. 1 is a diametric section through a housing equipped with a seal embodying the invention, showing the seal partly in section and partly in side elevation.
Fig. 2 is an end view of Fig. 1.

Referring to the drawing, I have shown a self-contained, centrally apertured seal, generally designated by the numeral 10, which is inserted as an assembled unit within a tubular housing 12 in encompassing relation to a centrally located rotatable shaft 14. The seal 10 comprises a cup-shaped sheet metal stamping 16 having a radially extending flange 18 and an axially extending flange 20, the latter being adapted to engage the inner wall of the tubular housing 12. The free end of the axially extending flange 20 is of reduced thickness and is bent inwardly and at right angles to the flange 20 forming a radially extending flange 22 which serves to retain a leather packing 24 and a metallic centrally apertured ring 26 in assembled relation with the stamping 16.

Figure 3:
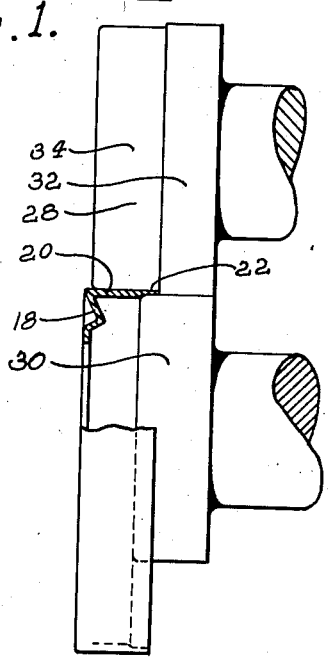
Fig. 3 is a side view illustrating means for initially deforming a portion of the metallic housing, parts being broken away and in section.

In conditioning the metallic stamping 16 for assembly with the component parts of the seal, the free end 22 of the axially extending flange 20 is inserted between a pair of relatively rotatable rollers 28 and 30 and the thickness thereof reduced by a cold rolling operation, as illustrated in Fig. 3. The roller 28 has parts 32 and 34 of different diameters, the part 32 being in rolling contact with the roller 30, but of less width than the latter so that a portion of the part 34 is in the same vertical plane with the roller 30 but not in rolling contact therewith. The free end of the flange 20 of the metallic stamping 16 is inserted between the overlapping portions of the roller 30 and the part 34 of the roller 28 and rolled to a reduced thickness. The length of the reduced portion of the flange 20 is predetermined by the extent of the overlapping of the roller 30 and part 34 of the roller 28.

The component parts of the sealing unit are assembled within the cup-shaped stamping 16 and the unit is inserted between a pair of axially aligned rollers 36 and 38, the former having a relatively shallow circular recess 40 in which the unit is received. The roller 40 is provided with an end portion 42 which conforms generally to the contour of the adjacent face of the sealing unit with which it contacts. The roller 38 is provided with a part 44 adjacent the part 42 but of less diameter than the latter. A third roller 46 is arranged in parallel relationship with the rollers 36 and 38, the former having parts 48 and 50 of different diameters which are spaced from the parts 42 and 44 of the roller 38. The larger part 48 is in radial alignment with the smaller part 44 of the roller 38, and the smaller part 50 is in axial alignment with the larger part 42 of the roller 38, a space being provided between the respective radially aligned parts.

Figure 4:
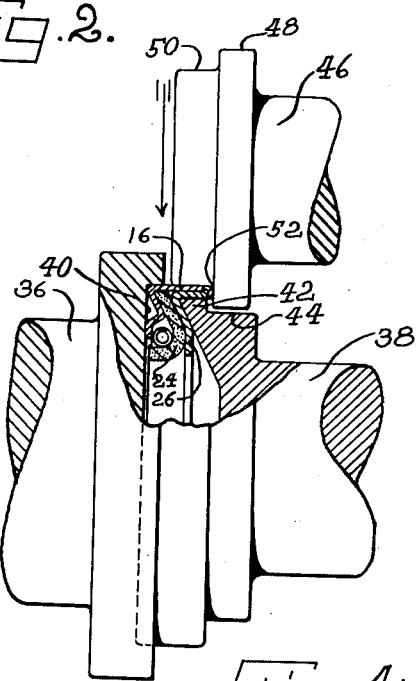
Fig. 4 is a side view illustrating means permanently fixing the component parts of the sealing unit in assembled relation, parts being broken away and in section.

In operation of the mechanism, the parts of the seal are assembled within the stamping 16 and this assembly is placed into the recess 40 of the roller 38 and one of the rollers 36 or 38 is moved axially thereby pressing the parts axially into the desired relation. Assuming that the roller 36 is moved axially, the reduced end portion of the free end of the flange 20 of the stamping 16 engages a shoulder 52 between the parts 48 and 50 of the roller 38 and further pressure causes the outer extremity of the reduced portion to be spun over the metallic ring 26, and upon rotation of the rollers illustrated in Fig. 4, the free end of the flange 20 is bent inwardly forming the flange 22 about the entire peripheral edge.

What I claim is:

The method of forming a metallic housing for an oil seal which consists in forming a metallic cup member having a base portion and a peripheral flange portion substantially at right angles to the base thereof, rolling the outer edge of the peripheral flange portion to reduce its thickness, assembling a leather packing member and a metallic member in the cup member, and finally crimping the reduced outer portion of the peripheral flange inwardly into pressing engagement with the metallic member thereby forcing said member to press against said leather packing.

SIMPSON C. LEONARD, Jr.